(12) United States Patent
Kong (10) Patent No.: US 10,599,387 B2
(45) Date of Patent: Mar. 24, 2020

(54) METHOD AND DEVICE FOR DETERMINING DELAY OF AUDIO

(71) Applicant: TENCENT TECHNOLOGY (SHENZHEN) COMPANY LIMITED, Shenzhen (CN)

(72) Inventor: Lingcheng Kong, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 0 days.

(21) Appl. No.: 15/975,525

(22) PCT Filed: Jul. 21, 2017

(86) PCT No.: PCT/CN2017/093798
§ 371 (c)(1),
(2) Date: May 9, 2018

(87) PCT Pub. No.: WO2018/019181
PCT Pub. Date: Feb. 1, 2018

(65) Prior Publication Data
US 2019/0138263 A1 May 9, 2019

(30) Foreign Application Priority Data
Jul. 29, 2016 (CN) .......................... 2016 1 0617671

(51) Int. Cl.
*G06F 17/00* (2019.01)
*G06F 3/16* (2006.01)
(Continued)

(52) U.S. Cl.
CPC .............. *G06F 3/165* (2013.01); *G10H 1/10* (2013.01); *G10L 19/018* (2013.01); *G10L 25/51* (2013.01)

(58) Field of Classification Search
CPC ...... H04N 21/4394; G06F 3/165; G10H 1/10; G10L 19/018; G10L 25/51
See application file for complete search history.

(56) References Cited

U.S. PATENT DOCUMENTS

| | | | |
|---|---|---|---|
| 2011/0112669 A1* | 5/2011 | Scharrer | G10L 19/008 700/94 |
| 2017/0047094 A1* | 2/2017 | Leppanen | G11B 27/031 |
| 2017/0230610 A1* | 8/2017 | Tcheng | G11B 27/031 |

FOREIGN PATENT DOCUMENTS

| | | |
|---|---|---|
| CN | 1152163 A | 6/1997 |
| CN | 102340482 A | 2/2012 |

(Continued)

OTHER PUBLICATIONS

Office Action dated Apr. 28, 2018, in Chinese Patent Application No. 2016106176711, filed Jul. 29, 2016 (with English-language translation).

*Primary Examiner* — Fan S Tsang
*Assistant Examiner* — David Siegel
(74) *Attorney, Agent, or Firm* — Oblon, McClelland, Maier & Neustadt, L.L.P.

(57) ABSTRACT

A method of determining an audio delay and a corresponding device are provided. The first audio data and second audio data are obtained. A first sub-fingerprint sequence of the first audio data and a second sub-fingerprint sequence of the second audio data is extracted. The first sub-fingerprint sequence includes at least one first sub-fingerprint and the second sub-fingerprint sequence includes at least one second sub-fingerprint. Processing circuitry determines similarity coefficients corresponding to similarities between the first sub-fingerprint sequence and the second sub-fingerprint sequence. The processing circuitry determines a matching level between the first sub-fingerprint sequence and the second sub-fingerprint sequence according to the similarity (Continued)

coefficients. The processing circuitry determines, according to the matching level, a delay of the second audio data relative to the first audio data. The method and device can improve calculation precision, thereby correspondingly improving a delay compensation effect, and alleviating a dual sound phenomenon.

16 Claims, 3 Drawing Sheets

(51) Int. Cl.
  *G10H 1/10* (2006.01)
  *G10L 19/018* (2013.01)
  *G10L 25/51* (2013.01)

(56) References Cited

FOREIGN PATENT DOCUMENTS

| CN | 204231580 U | 3/2015 |
| JP | 9-269790 | 10/1997 |
| JP | 2009-122598 | 6/2009 |

* cited by examiner

METHOD AND DEVICE FOR DETERMINING DELAY OF AUDIO

RELATED APPLICATION

This application is a continuation of International Application No. PCT/CN2017/093798, filed on Jul. 21, 2017, which claims priority to Chinese Patent Application No. 201610617671.1, filed with the Chinese Patent Office on Jul. 29, 2016 and entitled "AUDIO DELAY ESTIMATION METHOD AND TERMINAL DEVICE", which are incorporated by reference in their entirety.

FIELD OF THE TECHNOLOGY

This application relates to the field of audio processing technologies, and in particular, to an audio delay determining method and device.

BACKGROUND OF THE DISCLOSURE

In a karaoke process, at a host end, an accompaniment is played while singing sounds of the host are captured. Audio recorded in a karaoke device includes the singing sounds of the host and the played accompaniment. The captured singing sounds and the accompaniment need to be combined by using the karaoke device, to obtain final singing audio. When the karaoke device is used to combine the singing sounds and the accompaniment, it needs to be ensured that the singing sounds keep pace with the accompaniment at each playback time point, otherwise a dual sound phenomenon may occur due to a delay of the singing sounds relative to the accompaniment, and consequently, for a listener, it sounds like that the host is not on the beat. To resolve the problem of the dual sound, delay prediction may be performed, and then during combination, delay compensation is performed on the singing sounds by using a predicted delay value, so that the singing sounds keep pace with the accompaniment at each playback time point.

Currently, delay compensation is performed on a singing sounds mainly by using a method based on time domain prediction, such as an energy method, an autocorrelation method, or a contour method. Although a delay can be reduced by using the method to some extent, anti-noise performance is relatively poor. Consequently, a predicted delay value is not accurate, causing an unsatisfactory delay compensation effect.

SUMMARY

This application provides an audio delay determining method and device, to resolve a problem of a relatively poor audio delay compensation effect.

According to a first aspect, an audio delay determining method is provided. The first audio data and second audio data are obtained. A first sub-fingerprint sequence of the first audio data and a second sub-fingerprint sequence of the second audio data is extracted. The first sub-fingerprint sequence includes at least one first sub-fingerprint and the second sub-fingerprint sequence includes at least one second sub-fingerprint. Processing circuitry determines similarity coefficients corresponding to similarities between the first sub-fingerprint sequence and the second sub-fingerprint sequence. The processing circuitry determines a matching level between the first sub-fingerprint sequence and the second sub-fingerprint sequence according to the similarity coefficients. The processing circuitry determines, according to the matching level, a delay of the second audio data relative to the first audio data.

According to a second aspect, this application provides a device. The device includes processing circuitry that obtains first audio data and second audio data, The processing circuitry extracts a first sub-fingerprint sequence of the first audio data and a second sub-fingerprint sequence of the second audio data, the first sub-fingerprint sequence including at least one first sub-fingerprint, and the second sub-fingerprint sequence including at least one second sub-fingerprint. The processing circuitry determines similarity coefficients corresponding to similarities between the first sub-fingerprint sequence and the second sub-fingerprint sequence. The processing circuitry determines a matching level between the first sub-fingerprint sequence and the second sub-fingerprint sequence according to the similarity coefficients. The processing circuitry determines, according to the matching level, a delay of the second audio data relative to the first audio data.

In the solutions provided in this application, fingerprint characteristic extraction is performed on first accompaniment audio of a piece of music and recorded audio, to obtain a first sub-fingerprint sequence and a second sub-fingerprint sequence. A similarity between the first sub-fingerprint sequence and the second sub-fingerprint sequence is determined according to a sub-fingerprint selected for each time, to obtain multiple similarities. Then a matching level is obtained according to the calculated similarity coefficients. Delay compensation duration of the recorded audio relative to the accompaniment audio is calculated according to the matching level, to improve calculation precision, thereby correspondingly improving a delay compensation effect, and alleviating a dual sound phenomenon.

DESCRIPTION OF EMBODIMENTS

Embodiments of this application provide a recording delay estimation method and device, applied to the field of audio processing technologies, for example, scenarios such as online karaoke, real-time online broadcasting of a broadcasting station, and real-time karaoke in a KTV, to improve estimation precision of delay compensation duration, thereby correspondingly improving a delay compensation effect, and alleviating a dual sound phenomenon.

The following clearly describes the technical solutions in the embodiments of this application with reference to the accompanying drawings in the embodiments of this application. The described embodiments are only some but not all of the embodiments of this application. All other embodiments obtained by a person skilled in the technology based on the embodiments of this application shall fall within the protection scope of this application.

In the specification, claims, and accompanying drawings of this application, the terms "first", "second", and so on are intended to distinguish between similar objects but do not necessarily indicate a specific order or sequence. It should be understood that the data termed in such a way are interchangeable in proper circumstances so that the embodiments of this application described herein can be implemented in other orders than the order illustrated or described herein. Moreover, the terms "include", "contain" and any other variants mean to cover the non-exclusive inclusion, for example, a process, method, system, product, or device that includes a list of steps or modules is not necessarily limited to those steps or modules, but may include other steps or modules not expressly listed or inherent to such a process, method, system, product, or device. The module division in this specification is merely logical function division and may be other division in actual implementation. For example, multiple modules may be combined or integrated into another system, or some features may be ignored or not performed. In addition, the displayed or discussed mutual couplings or direct couplings or communication connections may be implemented by using some interfaces. The indirect couplings or communication connections between the modules may be implemented in electronic or other forms, which is not limited in this specification. In addition, the modules or submodules described as separate parts may or may not be physically separate, may or may not be physical modules, or may be distributed on multiple circuit modules. Some or all of the modules may be selected according to actual needs to achieve the objectives of the solutions of the embodiments in this application.

Figure 1:
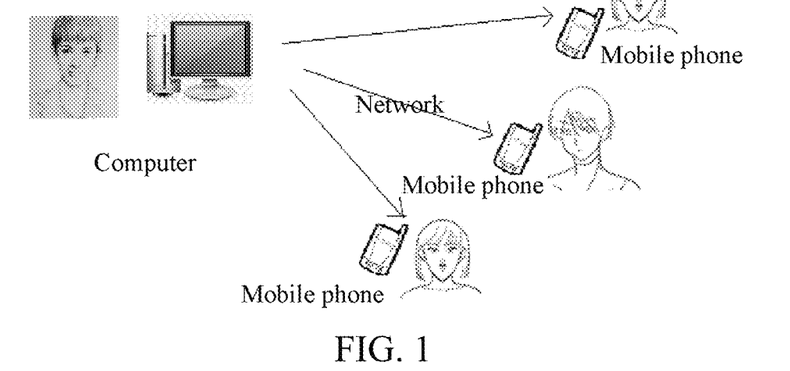
FIG. 1 is a schematic diagram of an application scenario according to an embodiment of this application.

As shown in FIG. 1, FIG. 1 is a schematic diagram of an application scenario according to an embodiment of this application. In FIG. 1, a user (such as a host) plays an accompaniment at a computer end, and sings with the accompaniment at the same time. The computer captures the accompaniment and the singing sound of the host, and then combines the accompaniment the singing sound by using karaoke software. During combination, a sub-fingerprint sequence A of the accompaniment and a sub-fingerprint sequence of the singing sound are respectively extracted. The sub-fingerprint sequence A includes multiple sub-fingerprints, and the sub-fingerprint sequence B includes multiple sub-fingerprints. The karaoke software calculates multiple similarities (similarity coefficients) between a sub-fingerprint of the sub-fingerprint sequence A and a sub-fingerprint the sub-fingerprint sequence B, then calculates a matching degree (level) between the sub-sequence fingerprint sequence A and the sub-fingerprint sequence B according to the calculated multiple similarities, and then calculates delay duration of the singing sound of the host relative to the accompaniment according to the calculated matching degree. The karaoke software performs delay compensation on the singing sound of the host according to the delay duration, combines the accompaniment and the singing sound of the host into broadcasting audio, and then broadcasts the audio. In this way, when receiving the broadcasting audio by using a mobile phone, another user does not feel that the singing sound of the host is not on the beat.

A system architecture based on the application scenario mainly includes a terminal device and at least one user equipment. In the application scenario shown in FIG. 1, the computer is a terminal device, and the mobile phone is user equipment. The terminal device and the user equipment may be connected to each other through a network (a wired network or a wireless network). For example, the user equipment may be connected to the terminal device through Bluetooth, wireless (WiFi), radio frequency, or the like.

The terminal device is a terminal device having a karaoke function. The terminal device can play an audio file while capturing an audio file, and combine the played audio file and the captured audio file into a new audio file. The terminal device may be a mobile terminal (such as a mobile phone), a computer, a notebook computer, an IPD, a broadcasting device of a television broadcast station, or a karaoke device. The karaoke device may be an online live-broadcasting karaoke device or a local karaoke device, or may be a device on which an interaction application having a live-broadcasting function is installed.

The user equipment is used by a user to receive audio data broadcast by the terminal device, for example, a radio, a mobile terminal (such as a mobile phone), a computer, a notebook computer. This is not specifically limited in this specification.

It should be noted that, although FIG. 1 shows that the terminal device and the user equipment are two devices that are physically separate. A person skilled in the technology may understand that, the user equipment and the terminal device may be implemented by using a physical device. For example, in FIG. 1, there may be no mobile phone. The computer is not only the terminal device, but also the user equipment. In this case, the user may directly listen to audio played on the computer. For another example, the terminal device may be a local karaoke device or the like. In this case, the user does needs to use the foregoing user equipment to receive the audio data broadcast by the terminal device, and the user may be an audience in live karaoke.

According to this embodiment of this application, fingerprint characteristic extraction is performed on an input singing sound and accompaniment, to obtain a sub-fingerprint sequence A corresponding to the singing sound and a sub-fingerprint sequence B corresponding to the accompaniment; then multiple similarities between the sub-fingerprint sequence A and the sub-fingerprint sequence B are determined according to n sub-fingerprints in the sub-fingerprint sequence A and n sub-fingerprints in the sub-fingerprint sequence B; a matching degree between the sub-fingerprint sequence A and sub-fingerprint sequence B is determined according to the multiple similarities, and delay compensation duration of the singing sound relative to the accompaniment is determined according to the matching degree.

According to this embodiment of this application, after the delay compensation duration of the singing sound relative to the accompaniment is determined, the singing sound may be compensated according to the delay compensation duration.

A minimum quantity of times needed to transform a sub-fingerprint in the sub-fingerprint sequence A to a sub-fingerprint in the sub-fingerprint sequence B may be used as a similarity between sub-fingerprints. Larger minimum quantity of times needed for transformation indicates greater inconsistency between the two sub-fingerprints and a lower similarity. It may be understood that the similarity is used to describe a degree in which the sub-fingerprints are different from each other.

The similarity between the sub-fingerprint sequence A and the sub-fingerprint sequence B is a weighted value of a similarity between a sub-fingerprint in the sub-fingerprint sequence A and a sub-fingerprint in the sub-fingerprint sequence B.

Figure 2:
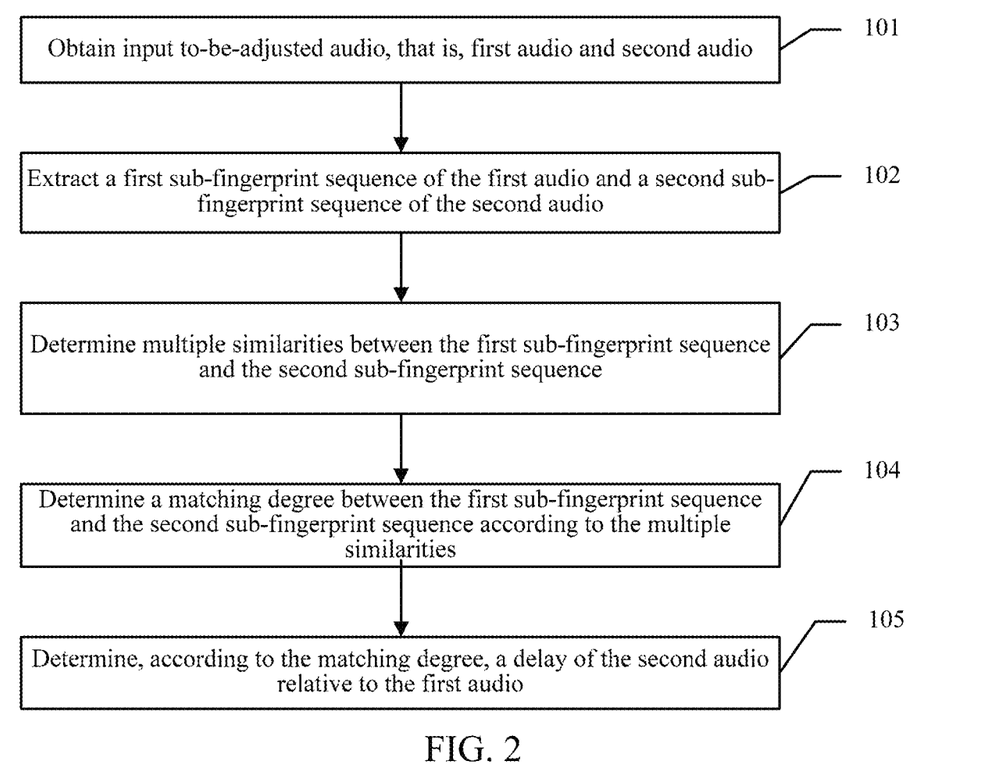
FIG. 2 is a schematic flowchart of an audio delay determining method according to an embodiment of this application.

Referring to FIG. 2, FIG. 2 shows an embodiment of an audio delay estimation or determining method in the embodiments of this application. This embodiment includes:

101: Obtain input to-be-adjusted audio.

The to-be-adjusted audio includes first audio and second audio. The first audio may be first accompaniment audio, and the second audio may be recorded audio recorded according to the first accompaniment audio. The to-be-adjusted audio may be obtained in real time.

The first accompaniment audio is an accompaniment in a music library of a karaoke application embedded in the terminal device. The karaoke application may play the first accompaniment audio while recording recorded audio input by a user (or a host) according to the played first accompaniment audio. The recorded audio may include a sound of the user and/or second accompaniment audio. The second accompaniment audio is the first accompaniment audio that is played by the karaoke software and that is recorded by the karaoke software. That is, the first accompaniment audio is stored in the music library, and is played during karaoke. Therefore, the second accompaniment audio is the first accompaniment audio that is played and recorded.

In this embodiment of this application, the recorded audio may be audio input to a terminal device from the outside of the terminal device.

For example, when a host play a song online in a broadcasting station, the accompaniment audio is the song played by the host, and correspondingly, the recorded audio may be a singing sound or a reading sound of the host. For another example, in an online karaoke scenario, a song played by a user A on a terminal is the accompaniment audio, and a singing sound that is of the user A following the played song and recorded into the terminal is the recorded audio. A scenario of the accompaniment audio and the recorded audio is not limited in this embodiment of this application.

102: Extract a first sub-fingerprint sequence of the first audio and a second sub-fingerprint sequence of the second audio.

The first sub-fingerprint sequence and the second sub-fingerprint sequence are both audio fingerprint sequences. The first sub-fingerprint sequence includes at least one first sub-fingerprint, and the second sub-fingerprint sequence includes at least one second sub-fingerprint. The at least one first sub-fingerprint and the at least one second sub-fingerprint are sorted according to a chronological order of a time domain, and each sub-fingerprint has a corresponding number. Each sub-fingerprint may be an analysis frame. Each analysis frame in an audio fingerprint sequence is sorted according to a chronological order of time.

Because a frame of data generates a sub-fingerprint, each sub-fingerprint corresponds to a number in a time domain. The first sub-fingerprint sequence and the second sub-fingerprint sequence each may be an integer sequence forming a sub-fingerprint. The integer sequence may be a binary sequence, for example, a 0/1 sequence including, or may be a sequence in another end-on system, provided that the sequence can form a sub-fingerprint. This is not specifically limited in this embodiment of this application.

To further improve precision of delay compensation duration, before the first sub-fingerprint sequence and the second sub-fingerprint sequence are extracted, frame division and windowing processing, and time-frequency transformation may be performed on the to-be-adjusted audio. Because a frequency domain has relatively desirable antinoise performance, the first sub-fingerprint sequence and the second sub-fingerprint sequence that are extracted after time-frequency transformation is performed the audio data has relatively desirable antinoise performance. Therefore, the calculated multiple similarities are more precise, and correspondingly, the delay compensation duration is of higher precision. The following respectively describes frame division and windowing processing, time-frequency transformation, and fingerprint characteristic extraction:

(1) Frame division and windowing processing means that a time domain signal is divided into multiple analysis frames and windowed. In the processing, a section of speech signal may be extracted and analyzed for each time, with no need to perform one-off processing on a quite long speech signal, to ensure stability of the speech signal in a short time period, thereby correspondingly improving data processing precision.

(2) Time-frequency transformation is performing transformation by using Fourier transformation and inverse Fourier transformation repeatedly in a time domain and a frequency domain, until a converged calculation result is obtained. A calculation time period can be greatly reduced by using time-frequency transformation, to improve calculation efficiency.

(3) Fingerprint characteristic extraction is extracting an audio fingerprint of a frame. Fingerprint characteristic extraction may be used for searching and audio recognition. An algorithm for fingerprint characteristic extraction may be a perceiving hash (phash) algorithm, a landmark algorithm, a wavelet (wavelet) algorithm, or the like. This is not specifically limited in this embodiment of this application.

103: Determine multiple similarities between the first sub-fingerprint sequence and the second sub-fingerprint sequence.

In this step, multiple selection operations may be performed. For each time, a same quantity of sub-fingerprints may be selected separately from the first sub-fingerprint sequence and the second sub-fingerprint sequence, and a similarity between the first sub-fingerprint sequence and the second sub-fingerprint sequence is determined according to the sub-fingerprint selected for each time, to obtain the multiple similarities.

Because the first sub-fingerprint sequence includes at least one first sub-fingerprint, the second sub-fingerprint sequence includes the at least one second sub-fingerprint, and a similarity between a first sub-fingerprint in the first sub-fingerprint sequence and a second sub-fingerprint in the second sub-fingerprint sequence is determined, the similarity between the two sub-fingerprints may be used to represent a similarity between some sub-fingerprints in the two sub-fingerprint sequences. A similarity between the two sub-fingerprint sequences is represented by calculating similarities between multiple sub-fingerprints in the first sub-fingerprint sequence and multiple sub-fingerprints in the second sub-fingerprint sequence.

In some implementations, the multiple similarities may be obtained by using the following manners:

A relative shift (shifting operation) on the first sub-fingerprint sequence and the second sub-fingerprint sequence is performed for at least one time; and a similarity that is between the first sub-fingerprint sequence and the second sub-fingerprint sequence and that is corresponding to a shift result of the relative shift is calculated according to the shift result for each time. There is at least one sub-fingerprint on which the relative shift is performed for each time. A quantity of selected sub-fingerprints on which the relative shift is performed is not specifically limited in this application. The quantity may be set to a fixed value for each time, for example, 1 for each time; or may be selected in descending order for each time, for example, 5, 4, 3, 2, and 1 in sequence. The quantity of selected sub-fingerprints on which the relative shift is performed for each time may be fixed, or may be dynamically selected according to a rule (for example, according to a quantity of remaining sub-fingerprints), and specifically, may be selected according to calculation precision or a calculation capability of the terminal device or a user requirement. This is not limited in this application.

104: Determine a matching degree between the first sub-fingerprint sequence and the second sub-fingerprint sequence according to the multiple similarities.

That is, the matching degree between the first sub-fingerprint sequence and the second sub-fingerprint sequence is obtained according to the similarity between the two sub-fingerprint sequences.

The matching degree can represent an entire similarity of the first sub-fingerprint sequence and the second sub-fingerprint sequence. For example, if the similarity between the first sub-fingerprint and the second sub-fingerprint is already known, although similarities of local parts of the sub-fingerprint sequences can be determined, some parts may have high similarities, and other parts may have low similarities. Therefore, the similarity between the sub-fingerprint sequences can only be roughly determined, and an actual similarity between the entire sub-fingerprint sequences cannot be determined according to a single similarity. In this application, multiple sub-fingerprints are selected for each time, and then similarities between the multiple sub-fingerprints are calculated to represent a similarity between two sub-fingerprint sequences. It should be noted that, there are many manners in which the similarities between the sub-fingerprints is calculated to represent the similarity between the two sub-fingerprint sequences. For example, a weighted value of the similarity may be obtained according to the first sub-fingerprint and the second sub-fingerprint. Then, determining the similarity between the sub-fingerprint sequences according to the weighted value is relatively precise, and can reflects the actual similarity between the first sub-fingerprint sequence and the second sub-fingerprint sequence.

There are mainly two manners for determining the matching degree according to the multiple similarities as follows:

1. Select a similarity meeting a preset rule from the multiple similarities as the matching degree. For example, a maximum similarity may be selected as the matching degree.

2. Calculate an average value of the multiple similarities, and use the average value as the matching degree.

105: Determine, according to the matching degree, a delay (delay compensation duration) of the second audio (such as recorded audio) relative to the first audio (such as accompaniment audio).

In this embodiment of this application, frame division and windowing processing, time-frequency transformation, and fingerprint characteristic extraction may be performed on the accompaniment audio and the recorded audio, to obtain the first sub-fingerprint sequence and the second sub-fingerprint sequence. Because a frequency domain has relatively desirable antinoise performance, the first sub-fingerprint sequence and the second sub-fingerprint sequence that are extracted after time-frequency transformation is performed has relatively desirable antinoise performance. Therefore, the calculated multiple similarities are more precise, and correspondingly, the delay compensation duration is of higher precision. Delay compensation duration of the recorded audio relative to the accompaniment audio is calculated according to the matching degree, and the delay compensation duration is calculated by using time-frequency transformation and the matching degree, to improve calculation precision, thereby correspondingly improving a delay compensation effect and alleviating a dual sound phenomenon.

Optionally, in some embodiments of this application, to reduce a calculation time period, before frame division and windowing processing are performed on the to-be-adjusted audio, down-sampling processing may be performed on the to-be-adjusted audio, that is, the accompaniment audio and the recorded audio are sampled, to have a same frequency, to reduce a sampling rate of the to-be-adjusted audio. For example, the accompaniment audio and the recorded audio may be sampled in a pre-processing link, to have a particular frequency processing, for example, 5 kilohertz (KHz). A sampling rate is not specifically limited. A quantity of sampling points may be obtained by multiplying a preset frame length and the sampling rate. For example, if the preset frame length is 5.6 millisecond (ms), and the sampling rate is 5 kHz, the quantity of sampling points in each frame is 58.

Optionally, in some embodiments, the frame division and windowing processing includes:

invoking a window function to divide the to-be-adjusted audio into multiple analysis frames of a preset frame length; and performing windowing processing on each analysis frame.

The window function may be any one of a Hamming window function, a Hanning window function, and a Gaussian window function. The window function is a function of which there is a non-zero value in an interval and that is 0 in an interval. A signal in a window represents a signal of a cycle, and a finite time segment is captured from the signal, and then the captured time segment is extended periodically, to obtain a virtual signal with an infinite signal. In addition, to reduce spectrum energy leakage, different window functions may be used for different sections according to an actual signal processing status to perform capturing. This is not specifically limited in this embodiment of this application.

When frame division windowing is performed on a Hamming window function, a Hamming window is applied to each analysis frame. Correspondingly, a similarity subsequently obtained is a Hamming window distance, that is, to represent a similarity between represent the first sub-fingerprint sequence and the second sub-fingerprint sequence; or may be understood as a minimum replacement bit needed for transformation from the first sub-fingerprint sequence and the second sub-fingerprint sequence, or may be understood as a quantity of character differences between the first sub-fingerprint sequence and the second sub-fingerprint sequence, or may alternatively be understood as a signal distance between the first sub-fingerprint sequence and the second sub-fingerprint sequence. A process of using the Hanning window function and the Gaussion function to perform frame division and windowing processing is similar. Details are not described again.

Optionally, in some embodiments, the first sub-fingerprint sequence and the second sub-fingerprint sequence are both integer sequences. The following respectively describes how to extract fingerprint characteristics of the first accompaniment audio and the recorded audio, that is, extract the foregoing first sub-fingerprint sequence and the foregoing second sub-fingerprint sequence.

1. For first accompaniment audio:
    mapping the analysis frame that is transformed to a frequency domain and that is windowed to a bark domain, and dividing the analysis frame mapped to the bark domain into N subbands that do not intersect with each other in the frequency domain, where N is a positive integer;
    performing, in each analysis frame, second difference on a subbands that are in the N subbands and that are neighboring to each other in the frequency domain, to obtain (N−1) differential values obtained through second difference, where a is an energy value obtained through spectrum analysis and is a positive integer greater than 2 and less than N; and
    generating, according to the (N−1) differential values obtained through second difference, an integer sequence used to form a sub-fingerprint.

For extraction of the fingerprint characteristic of the first accompaniment audio, that N=33 and a=3 is used as an example. An analysis frame mapped to the bark domain is divided into 33 subbands that do not intersect with each other in the frequency domain; second difference on 3 subbands that are in the 33 subbands and that are neighboring to each other in the frequency domain is performed in each analysis frame, to obtain 32 differential values obtained through second difference; and an integer sequence used to form a sub-fingerprint is generated according to the 32 differential values. For extraction of the fingerprint characteristic of the recorded audio, refer to the foregoing process.

2. For the Recorded Audio:
    mapping the analysis frame that is transformed to a frequency domain and that is windowed to a bark domain, and dividing the analysis frame mapped to the bark domain into N subbands that do not intersect with other in the frequency domain;
    performing, in each analysis frame, second difference on a subbands that are in the N subbands and that are neighboring to each other in the frequency domain, to obtain (N−1) differential values obtained through second difference; and
    generating, according to the (N−1) differential values obtained through second difference, an integer sequence used to form a sub-fingerprint.

The bark domain is a critical frequency band of a signal in a frequency band, and may be represented by using an proximity function.

Correspondingly, the extraction of the fingerprint characteristic of the recorded audio is similar to that of the first accompaniment audio. Details are not described herein again. It may be understood that, when the fingerprint characteristics of the first accompaniment audio and the recorded audio are respectively extracted, a value of a may be selected according to actual spectrum property of the audio. For the first accompaniment audio and the recorded audio, a may be the same or different. A specific value of a is not limited in this embodiment of this application.

For example, if each analysis frame, that is, a frame of data is: $x=\{x_0, x_1, x_2, \ldots, x_n\}$, and n is a quantity of sampling points, the formula of mapping from a frequency domain f to a bark space is:

$$b_j = *a\sinh\left(f * \frac{f}{600}\right) j = \{1, 2, \ldots, \frac{N}{2}\}$$

A coefficient of mapping $b_j$ to the $i^{th}$ subband is:

$$w_{i,j} = 10^{min(I,h,0)}$$

A sum of spectrum amplitudes included in all the subbands is calculated as:

$$B_i = \sum_{j=1}^{N/2} w_{i,j} * b_i \quad j = \{1, 2, \ldots, \frac{N}{2}\},$$

$$i = \{0, 1, 2, \ldots, 32\}$$

After the operations of the foregoing two formulas, a process of generating a sub-fingerprint is as follows:

First, a differential value $H_i$ is calculated according to two $B_i$ neighboring to each other in a current frame and two preB$_i$ neighboring to each other in a next frame, that is:

$$H_i = B_i - B_{i+1} - (\text{pre}B_i - \text{pre}B_{i+1}) i = \{0, 1, \ldots, 31\}$$

Then, an integer, that is, the sub-fingerprint, having 32 bits is generated according to a generation rule. The generation rule is: if $H_i > 0$, the $i^{th}$ bit of the integer having 32 bits is 1; or if $H_i < 0$, the $i^{th}$ bit of the integer having 32 bits is 0.

Optionally, in some embodiments, because spectrum characteristics of first accompaniment audio and recorded audio of an input terminal device are different, corresponding extracted fingerprint characteristics are different, that is, lengths of the first sub-fingerprint sequence and the second sub-fingerprint sequence may be different. In addition, the foregoing similarity is obtained by performing an exclusive-OR operation on the first sub-fingerprint sequence and the second sub-fingerprint sequence, and the exclusive-OR operation is logically a "bitwise AND" operation. Therefore, when the exclusive-OR operation is performed on the first sub-fingerprint sequence and the second sub-fingerprint sequence, for an extra 0/1 sequence, there is no object for the exclusive-OR operation, and a result cannot be obtained. To improve operation efficiency and improve operation precision, the exclusive-OR operation may be performed after sub-fingerprint sequences of which 0/1 sequences have a same length are extracted.

The following describes a specific process of obtaining the similarity between the first sub-fingerprint sequence and the second sub-fingerprint sequence through a relative shift. It should be noted that, the following only provides a specific implementation, but this application is not limited to the implementation in the following steps:

Step A: Perform the relative shift on the first sub-fingerprint sequence and the second sub-fingerprint sequence from the first sub-fingerprint in sequence according to a chronological order of a time domain, so that the first sub-fingerprint sequence keeps pace with the second sub-fingerprint sequence partially or completely in a time domain after the relative shift for each time, to form multiple sub-fingerprint pairs.

In an interaction interface, a relative intuitive implementation is: after pulling the first sub-fingerprint sequence and the second sub-fingerprint sequence, a user may implement relative movement through slipping, dragging, translating, and the like, to stagger the two sub-fingerprint sequences. Certainly, an operation such as a relative shift may be directly performed by using a third-party application or a karaoke application. In addition, for a processing process inside the terminal device, the relative shift may be directly performed by a processor on the two sub-fingerprint sequences. A specific implementation manner is not limited in this embodiment of this application.

For example, the first sub-fingerprint sequence is moved backward relative to the second sub-fingerprint sequence in an ascending time domain direction by a sub-fingerprint, and subsequently, is moved by a sub-fingerprint in sequence. Certainly, the sub-fingerprint may not be moved from the first sub-fingerprint. The $p^{th}$ sub-fingerprint in the first sub-fingerprint sequence may be enabled to keep pace with the $q^{th}$ sub-fingerprint in the second sub-fingerprint sequence in the time domain. Referring to a relationship between p and q in the time domain, remaining sub-fingerprints are enabled to keep pace with each other in the time domain. Because the first sub-fingerprint sequence corresponds to the first accompaniment audio, the second sub-fingerprint sequence corresponds to the recorded audio, and usually, the recorded audio has a delay relative to the first accompaniment audio, duration by which the two sequences are staggered is less than the delay of the recorded audio relative to the accompaniment. In this case, p is less than or equal to q.

Figure 3:
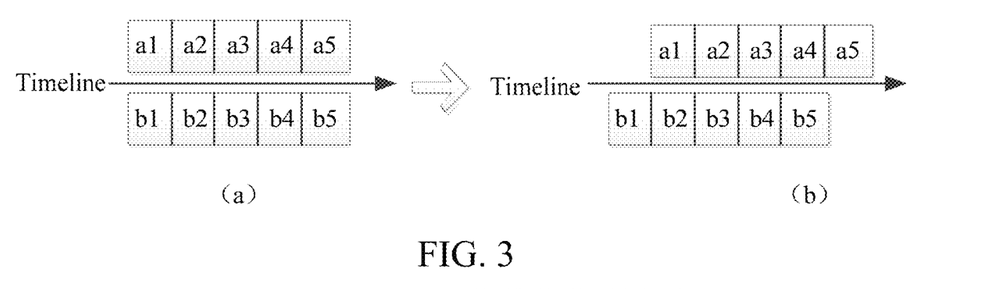
FIG. 3 is a schematic diagram of a state of a relative shift between two sub-fingerprint sequences according to an embodiment of this application.

As shown in (a) in FIG. 3, it is assumed that the first sub-fingerprint sequence includes sub-fingerprints a1, a2, a3, a4, and a5, the second sub-fingerprint sequence includes sub-fingerprints b1, b2, b3, b4, and b5, a1 and b1 are at a same location in the time domain, a2 and b2 are at a same location in the time domain, ..., and a5 and b5 are at a same location in the time domain. Then, a location of the second sub-fingerprint sequence in the time domain may be kept unchanged, and a1, a2, a3, a4, and a5 are together moved toward a direction shown by an arrow head by 1 sub-fingerprint, so that a relative location of the first sub-fingerprint sequence and the second sub-fingerprint sequence in the time domain after the shift is shown in (b) in FIG. 3, a1 and b2 are at a same location in the time domain, a2 and b3 are at a same location in the time domain, ..., and a4 and b5 are at a same location in the time domain, to obtain a sub-fingerprint pair formed by a1 and b2, a sub-fingerprint pair formed by a2 and b3, a sub-fingerprint pair formed by a3 and b4, and a sub-fingerprint pair formed by a4 and b5. The operations may be performed on subsequently obtained corresponding sub-fingerprint pairs. Details are not described again.

Step B: Select several sub-fingerprint pairs from the multiple sub-fingerprint pairs, and determine, according to a distance between two sub-fingerprints in each selected sub-fingerprint pair, the similarity between the first sub-fingerprint sequence and the second sub-fingerprint sequence.

According to the example of FIG. 3 in step A, for example, after a relative shift, a state shown in (b) in FIG. 3 is obtained, to respectively obtain a distance d1 between a1 and b2, a distance d2 between a2 and b3, a distance d3 between a3 and b4, and a distance d4 between a4 and b5. Then, a similarity between the first sub-fingerprint sequence and the second sub-fingerprint sequence may be obtained by using d1 to d4 and the formulas (1) to (4) in this application. For another relative shift, refer to the description herein, and details are not described.

In addition, because in most scenarios, multiple iterative operations need to be performed, the foregoing step A and step B may need to be repeatedly performed for multiple times, to obtain multiple similarities in step 103, and the foregoing relative shift manner is a finite recycle. Alternatively, after an operation stage arrives, an obtained similarity already can be used to calculate the delay compensation duration, the operation does not need to be continued.

Therefore, in the relative shift process, after step A and before step B, a determining operation may be added to determine whether it is necessary to continue a similar calculation operation. The operation is specifically as follows:

determining whether a quantity of times for which the relative shift is performed is less than a first threshold, and performing step A and step B repeatedly if the quantity is less than the first threshold. Optionally, the quantity may be determined according to remaining sub-fingerprint pairs that can keep pace with each other in the time domain.

Figure 4:
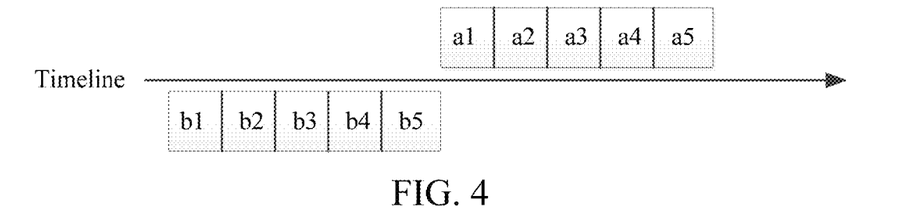
FIG. 4 is a schematic diagram of another state of a relative shift between two sub-fingerprint sequences according to an embodiment of this application.

The first threshold may be a value set according to experience. For example, it can be learned according to experience that, a delay between the recorded audio and the accompaniment is generally 2 frames. Therefore, the first threshold may be set to a value greater than 2. Certainly, the relative shift operation may be ended before no sub-fingerprint pair exists in the relative shift between the first sub-fingerprint sequence and the second sub-fingerprint sequence. For example, after the relative shift is performed for 5 times (by a sub-fingerprint for each time) on the first sub-fingerprint sequence and the second sub-fingerprint sequence, a state shown in FIG. 4 is formed. Because no sub-fingerprint pair can be formed if the shift is performed on the first sub-fingerprint sequence and the second sub-fingerprint sequence continuously in an ascending the time domain direction, when the relative shift is performed when the state shown in FIG. 4 arrives, the relative shift operation may be ended.

The following describes a process of determining multiple similarities between the first sub-fingerprint sequence and the second sub-fingerprint sequence:

The first sub-fingerprint sequence includes $M_1$ first sub-fingerprints, and the second sub-fingerprint sequence includes $M_2$ second sub-fingerprints, where $M_1$ and $M_2$ are both positive integers.

Step A1: Extract M sub-fingerprints separately from the first sub-fingerprint sequence and the second sub-fingerprint sequence, where M first sub-fingerprints extracted from the first sub-fingerprint sequence correspond to M second sub-fingerprints extracted from the second sub-fingerprint sequence in the time domain, and $M=\min(M_1, M_2)$. That M first sub-fingerprints correspond to M second sub-fingerprints in the time domain means: a first sub-fingerprint and a second sub-fingerprint having a same number is in a same subframe, for example, a first sub-fingerprint having a number of 1 and a second sub-fingerprint having a number of 1 are in a same subframe, a first sub-fingerprint having a number of 2 and a second sub-fingerprint having a number of 2 are in a same subframe, ..., and the like. Details are not described again.

Step A2: First, before a relative shift operation is performed, the M first sub-fingerprints and the M second sub-fingerprints form M sub-fingerprint pairs, and each sub-fingerprint pair includes a first sub-fingerprint and a second sub-fingerprint that are at a same location in the time domain. An exclusive-OR operation is performed on the first sub-fingerprint and the second sub-fingerprint that are at a same location in the time domain in the M sub-fingerprint pairs, to obtain a distance between the first sub-fingerprint and the second sub-fingerprint that are at a same location in the time domain. There are totally M distances. The distance is used to represent a similarity between the first sub-fingerprint and the second sub-fingerprint that are at a same location in the time domain. Then, the similarity between the first sub-fingerprint sequence and the second sub-fingerprint sequence may be calculated by using the formulas (1) to (3) and the obtained M distances.

Then, the M first sub-fingerprints are shifted relative to the M second sub-fingerprints by a first sub-fingerprint. Because locations of the M first sub-fingerprints in the time domain after the relative shift are already changed, M−1 new sub-fingerprint pairs are formed. Similarly, an exclusive-OR operation is performed on the first sub-fingerprint and the second sub-fingerprint that are at a same location in the time domain in the M−1 sub-fingerprint pairs, to obtain a distance between the first sub-fingerprint and the second sub-fingerprint that are at a same location in the time domain. There are totally M−1 distances. The distance is used to represent a similarity between the first sub-fingerprint and the second sub-fingerprint that are at a same location in the time domain. Then, the similarity between the first sub-fingerprint sequence and the second sub-fingerprint sequence may be calculated by using the formulas (1) to (3) and the obtained M distances.

. . .

Finally, after M−1 relative shifts, M similarities are obtained, and then a matching degree may be obtained according to the M similarities. An average value of the M similarities may be used, or another calculation manner may be used, or another calculation formula may be added. A specific calculation manner is not limited in this application.

Optionally, the foregoing distance is a sum of error data bits in which retroflexion occurs in a binary character with a fixed length in communication. It indicates that a signal changes into a minimum replacement bit of another signal. For example, if a quantity of different bits between a binary character 510 and a binary character 1001 is 3, a distance between the two binary characters is 3, and the distance may be a Hamming window distance, a Hanning window distance, a Gaussion distance, or the like. A specific type is not limited in this embodiment of this application.

For example, a List_A represents a first sub-fingerprint sequence, a List_B represents a second sub-fingerprint sequence, List_A has $M_1$ sub-fingerprints, the $M_1$ sub-fingerprints are sorted according to numbers 0, 1, 2, . . . , and $M_1$, and each sub-fingerprint is a 0/1 sequence; and List_B has $M_2$ sub-fingerprints, the $M_2$ sub-fingerprint are sorted according to numbers 0, 1, 2, . . . , and $M_2$, and each sub-fingerprint is a 0/1 sequence.

Then, M sub-fingerprints are extracted respectively from List_A and List_B according to the content described in the foregoing step A1 and step A2, where M=min($M_1$, $M_2$). An exclusive-OR operation is performed on the sub-fingerprints 0, 1, 2, . . . , and M in List_A and the sub-fingerprints 0, 1, 2, . . . , and M in List_B in sequence according to a chronological order of the numbers, to obtain distances between M sub-fingerprints: $d_0, d_1, d_2, \ldots,$ and $d_M$. Specifically, the exclusive-OR operation is performed on sub-fingerprints having a number of 0 in List_A and sub-fingerprints having a number of 0 in List_B, and on sub-fingerprints having a number of 1 in List_A and sub-fingerprints having a number of 1 in List_B, and the like, and finally the distances between the M sub-fingerprints. Then, a similarity between List_A and List_B is obtained according to the distances between the M sub-fingerprints. Similarly, after List_A is shifted relative to List_B for multiple times, a similarity is obtained for each shift, and details are not described.

Optionally, in some embodiments, after a distance between a first sub-fingerprint and a second sub-fingerprint that are at a same location in the time domain, a corresponding matching degree between the first sub-fingerprint and the second sub-fingerprint may be calculated according to according to the distance between a first sub-fingerprint and a second sub-fingerprint that are at a same location in the time domain, and then the delay compensation duration is calculated according to the matching degree.

In this embodiment of this application, the process of calculating the delay compensation duration in the foregoing step 105 may include the following steps:

Step B1: Extract j sub-fingerprints respectively from the M first sub-fingerprints and the M second sub-fingerprints, where 1≤j≤M, and j is a positive integer.

It may be understood that, the j sub-fingerprints represent a quantity of sub-fingerprints for each time, and may be extracted for M times when the M similarities are calculated.

For example, during calculation of a similarity $P_1$, sub-fingerprints 0, 1, 2, . . . , and M are extracted from List_A, and sub-fingerprints 0, 1, 2, . . . , and M are extracted from List_B, and then a matching degree $P_1$ between the M sub-fingerprints extracted from List_A and the M sub-fingerprints extracted from List_B is calculated; during calculation of a similarity $P_2$, sub-fingerprints 0, 1, 2, . . . , and (M−1) are extracted from List_A, and sub-fingerprints 0, 1, 2, . . . , and M are extracted from List_B, and then a matching degree $P_2$ between the (M−1) sub-fingerprints extracted from List_A and the M sub-fingerprints extracted from List_B is calculated; and during calculation of a similarity $P_3$, sub-fingerprints 0, 1, 2, . . . , and (M−2) are extracted from List_A, and sub-fingerprints 0, 1, 2, . . . , and M are extracted from List_B, and then a matching degree $P_3$ between the (M−2) sub-fingerprints extracted from List_A and the M sub-fingerprints extracted from List_B is calculated. The foregoing process is repeated, to respectively calculate $P_3, P_4, \ldots,$ and $P_M$.

It should be noted that, when the j sub-fingerprints are extracted respectively from the M first sub-fingerprints and the M second sub-fingerprints, sub-fingerprints may be selected according to numbers, or may not be selected according to numbers. The selected j sub-fingerprints may correspond to continuous numbers or discrete numbers, provided that quantities of sub-fingerprints respectively extracted from the sub-fingerprint sequence are the same. A specific manner for selecting the j sub-fingerprints of which a similarity needs to be calculated is not limited in this embodiment of this application.

Step B2: Obtain M similarities between the first sub-fingerprint sequence and the second sub-fingerprint sequence according to j, a similarity parameter, and the distance between the first sub-fingerprint and the second sub-fingerprint that are at a same location in the time domain.

Step B3: Determine a maximum similarity greater than a preset threshold from the M similarities. The preset threshold may be designed according to an actual application scenario. For example, in a KTV scenario, sound quality is required to be relatively high. In this case, a larger preset threshold may be set, to reduce a value range of the matching degree, to reduce operation power consumption and an operation delay. A specific value of this embodiment of this application is not limited.

Step B4: Select any similarity from the similarities greater than the preset threshold as the matching degree, and determine a number corresponding to a sub-fingerprint is x, where x is a positive integer greater than 0 and less than or equal to M, and therefore determine that the recorded audio is delayed relative to the accompaniment audio by x frames. Optionally, in a scenario requiring relatively high sound quality, a relatively high similarity may be selected as the matching degree as much as possible, for example, a maximum similarity may be selected as the matching degree. In this way, estimated delay duration is most precise, and correspondingly a dual sound phenomenon is less obvious. A specific matching degree is not limited in this embodiment of this application.

Alternatively, a relative shift between two sub-fingerprint sequences corresponding to a selected similarity (matching degree) is determined, to determine a delay of the recorded audio relative to the accompaniment audio. For example, W relative shifts are performed on the first sub-fingerprint sequence and the second sub-fingerprint sequence by N fingerprints (a relative shift T between the first sub-fingerprint sequence and the second sub-fingerprint sequence is "W*N"). In this case, a similarity between the first sub-fingerprint sequence and the second sub-fingerprint sequence is determined as the matching degree. The delay of the recorded audio relative to the accompaniment audio may be determined according to the relative shift T.

Step B5: Determine the delay compensation duration according to the x frames (or the relative shift T) and the preset frame length. Optionally, the delay compensation duration may be a product of the x frames (or the relative shift T) and the preset frame length, and the preset frame length is a length of each analysis frame.

Optionally, the similarity parameter may be a constant or a variable. When the similarity parameter is a constant, the constant may be different values selected according to different scenarios, or may be a fixed value used for all scenarios. A specific value is not limited in this embodiment of this application.

Optionally, in some embodiments, the obtaining M similarities between the first sub-fingerprints and the second sub-fingerprints that are at same locations in the time domain in the foregoing step B2 may specifically include the following steps:

Step B21: Obtain a first weighting factor according to j, a first weighting coefficient, and distances between the first sub-fingerprints and the second sub-fingerprints that are at same locations in the time domain, where the first weighting factor is a weighted value of the distances less than or equal to the preset threshold.

Step B22: Obtain a second weighting factor according to j, a second weighting coefficient, and distances between the first sub-fingerprints and the second sub-fingerprints that are at same locations in the time domain, where the second weighting factor is a weighted value of the distances greater than the preset threshold, and the second weighting coefficient may be the same as the first weighting coefficient.

Step B23: Obtain, according to the similarity parameter, the first weighting factor, and the second weighting factor, a similarity between the $j^{th}$ first sub-fingerprint and the $j^{th}$ second sub-fingerprint.

For example, after the distances $d_0, d_1, d_2, \ldots,$ and $d_N$ between the M sub-fingerprints are obtained in the foregoing content, the obtained M distances between the sub-fingerprints may be used to calculate the similarity. One of calculation formulas of the similarity Pi is as follows:

$$Pi = k * (1 + \text{below}_{factor} - \text{above}_{factor}) \quad (1)$$

$$\text{above}_{factor} = \frac{1}{j+1} \sum_{i=0}^{j} (1 - di) * y, \ y = \begin{cases} 0, & \text{if } di > \text{threshold} \\ 1, & \text{if } di \le \text{threshold} \end{cases} \quad (2)$$

$$\text{below}_{factor} = \frac{1}{j+1} \sum_{i=0}^{j} (1 - di) * y, \ y = \begin{cases} 1, & \text{if } di > \text{threshold} \\ 0, & \text{if } di \le \text{threshold} \end{cases} \quad (3)$$

k is the similarity parameter, $\text{above}_{factor}$ is the first weighting factor, $\text{below}_{factor}$ is the second weighting factor, y is the weighting coefficient, and threshold is the threshold.

It may be understood that, the formula (1) of Pi is a variation of the formula based on the foregoing content, for example, a variation of a parameter, a variable, or a coefficient, and includes but is not limited to the formula (1) provided in this embodiment of this application.

The following M similarities may be obtained according to the foregoing formulas (1), (2), and (3):

$$P_1, P_2, P_3, \ldots, P_{(M-1)}, \text{ and } P_M.$$

Finally, a maximum similarity Pn is selected from $P_1, P_2, P_3, \ldots, P_{(M-1)}$, and $P_M$ as a matching degree, and n is an positive greater than 1 and less than M. It indicates that after List_A is delayed by n frames, a similarity between List_A and List_B is the highest (corresponding to a smallest distance), that is, the recorded audio is delayed relative to the first accompaniment audio delay by n frames. If the preset frame length is 5.6 (ms), delay compensation duration that needs to be compensated is 5.6n (ms).

The audio delay determining method of this application is described above. The following describes a device for performing the foregoing audio delay determining method.

Figure 5:
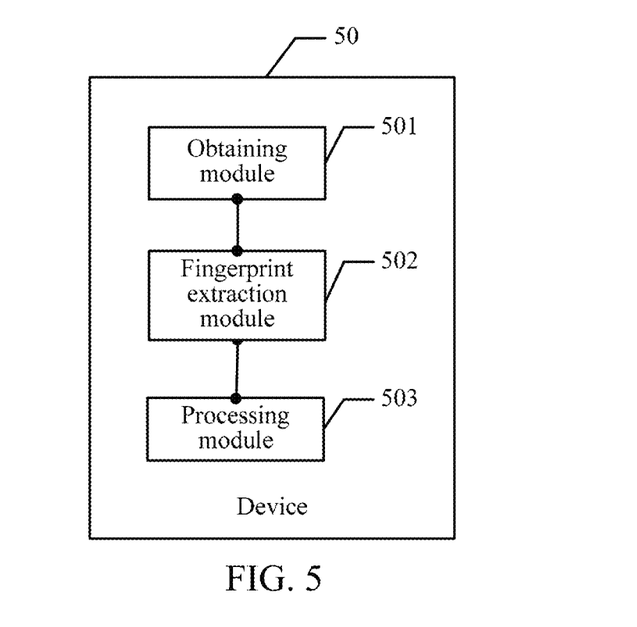
FIG. 5 is a schematic structural diagram of an audio delay determining device according to an embodiment of this application.

Referring to FIG. 5, a device 50 is described, and the device 50 may be a terminal device. The device 50 includes:

an obtaining module 501, configured to obtain input to-be-adjusted audio, the to-be-adjusted audio including first audio and second audio, where the first audio may be first accompaniment audio, and the second audio may be recording audio recorded according to the first accompaniment audio;

a fingerprint extraction module 502, configured to extract a first sub-fingerprint sequence of the first audio and a second sub-fingerprint sequence of the second audio, the first sub-fingerprint sequence comprising at least one first sub-fingerprint, and the second sub-fingerprint sequence comprising at least one second sub-fingerprint; and a processing module 503, configured to: determine multiple similarities between the first sub-fingerprint sequence and the second sub-fingerprint sequence;

determine a matching degree between the first sub-fingerprint sequence and the second sub-fingerprint sequence according to the multiple similarities; and determine, according to the matching degree, a delay of the second audio relative to the first audio.

In this embodiment of this application, the processing module 503 is further configured to:

perform multiple selection operations, and select, through the selection operation for each time, a same quantity of sub-fingerprints separately from the first sub-fingerprint sequence and the second sub-fingerprint sequence, to determine a similarity between the first sub-fingerprint sequence and the second sub-fingerprint sequence.

In this embodiment of this application, the processing module 503 performs fingerprint characteristic extraction on the first accompaniment audio and the recorded audio that are obtained by the obtaining module 501. The first sub-fingerprint sequence and the second sub-fingerprint sequence are obtained, and a similarity between the first sub-fingerprint sequence and the second sub-fingerprint sequence may be determined according to a sub-fingerprint selected for each time, to obtain the multiple similarities. Then the matching degree is calculated according to the calculated multiple similarities, the delay compensation duration of the recorded audio relative to the accompaniment audio is calculated according to the matching degree, to improve calculation precision, thereby correspondingly improving a delay compensation effect, and alleviating a dual sound phenomenon.

Optionally, in some embodiments, the processing module 503 is specifically configured to:

perform a relative shift on the first sub-fingerprint sequence and the second sub-fingerprint sequence for at least one time; and calculate a similarity that is between the first sub-fingerprint sequence and the second sub-fingerprint sequence and that is corresponding to a shift result of the relative shift is according to the shift result for each time.

Optionally, in some embodiments, the at least one first sub-fingerprint in the first sub-fingerprint sequence and the at least one second sub-fingerprint in the second sub-fingerprint sequence are sorted according to a chronological order of a time domain.

The processing module 503 is specifically configured to:

Step A: Perform the relative shift on the first sub-fingerprint sequence and the second sub-fingerprint sequence from the first sub-fingerprint in sequence according to a chronological order of a time domain.

The first sub-fingerprint sequence keeps pace with the second sub-fingerprint sequence partially or completely in a time domain after the relative shift for each time, to form multiple sub-fingerprint pairs. Optionally, there is one or more sub-fingerprints in the relative shift for each time.

The processing module 503 is specifically configured to:

Step B: Select several sub-fingerprint pairs from the multiple sub-fingerprint pairs, and determine, according to a distance between two sub-fingerprints in each selected sub-fingerprint pair, the similarity between the first sub-fingerprint sequence and the second sub-fingerprint sequence.

In the relative shift process, after step A and before step B, the processing module 503 is further configured to:

determine whether a quantity of times for which the relative shift is performed is less than a first threshold, and perform step A and step B repeatedly if the quantity is less than the first threshold.

Optionally, in some embodiments, the processing module 503 is specifically configured to:

determine the similarity between the first sub-fingerprint sequence and the second sub-fingerprint sequence:

$$Pi = k * (1 + \text{below}_{fator} - \text{above}_{fator});$$

$$\text{above}_{fator} = \frac{1}{j+1} \sum_{i=0}^{j} (1 - di) * y, \; y = \begin{cases} 0, & \text{if } di > \text{threshold} \\ 1, & \text{if } di \le \text{threshold} \end{cases}; \text{ and}$$

$$\text{below}_{fator} = \frac{1}{j+1} \sum_{i=0}^{j} (1 - di) * y, \; y = \begin{cases} 1, & \text{if } di > \text{threshold} \\ 0, & \text{if } di \le \text{threshold} \end{cases}.$$

Pi is the similarity between the first sub-fingerprint sequence and the second sub-fingerprint sequence, $\text{above}_{factor}$ is a first weighting factor, $\text{below}_{factor}$ is a second weighting factor, j is a quantity of the selected sub-fingerprint pairs, di is a distance between two sub-fingerprints in the $i^{th}$ selected sub-fingerprint pair, y is a weighting coefficient, and threshold is a preset threshold.

Optionally, in some embodiments, the processing module 503 is specifically configured to:

select a similarity meeting a preset rule from the multiple similarities as the matching degree; or calculate an average value of the multiple similarities, and use the average value as the matching degree.

Optionally, in some embodiments, before extracting the first sub-fingerprint in the first sub-fingerprint sequence and the second sub-fingerprint in the second sub-fingerprint sequence, the processing module 503 is further configured to:

perform frame division and windowing processing, and time-frequency transformation on the first audio and the second audio The processing module 503 invokes a window function to perform frame division and windowing processing on the to-be-adjusted audio, for example, divide the to-be-adjusted audio into multiple analysis frames of a preset frame length, and then performs windowing processing on each analysis frame. After windowing processing, the processing module 503 may further perform time-frequency transformation on each analysis frame.

Optionally, in some embodiments, the first sub-fingerprint sequence and the second sub-fingerprint sequence are both integer sequences, and the processing module 503 is specifically configured to:

map the analysis frame that is transformed to a frequency domain and that is windowed to a bark domain, and divide the analysis frame mapped to the bark domain into N subbands that do not intersect with other in the frequency domain, where N is a positive integer;

perform, in each analysis frame, second difference on a subbands that are in the N subbands and that are neighboring to each other in the frequency domain, to obtain (N−1) differential values obtained through second difference, where a is an energy value obtained through spectrum analysis and is a positive integer greater than 2 and less than N; and generate, according to the (N−1) differential values obtained through second difference, an integer sequence used to form a sub-fingerprint.

Optionally, in some embodiments, the processing module 503 is specifically configured to:

determine that a number of the sub-fingerprint corresponding to the target matching degree is x, where x is a positive integer greater than 0 and less than or equal to M, and determine that the recorded audio is delayed relative to the accompaniment audio delay by x frames; and determine the delay compensation duration according to the x frames and the preset frame length.

Optionally, in some embodiments, the processing module 503 is specifically configured to:

determine a relative shift that is between the first sub-fingerprint sequence and the second sub-fingerprint sequence and that is corresponding to the matching degree; and determine the delay according to the relative shift and the preset frame length.

The device in this embodiment of this application is described from an angle of modulus functional entities above. The following describes the device in this embodiment of this application from an angle of hardware processing.

Figure 6:
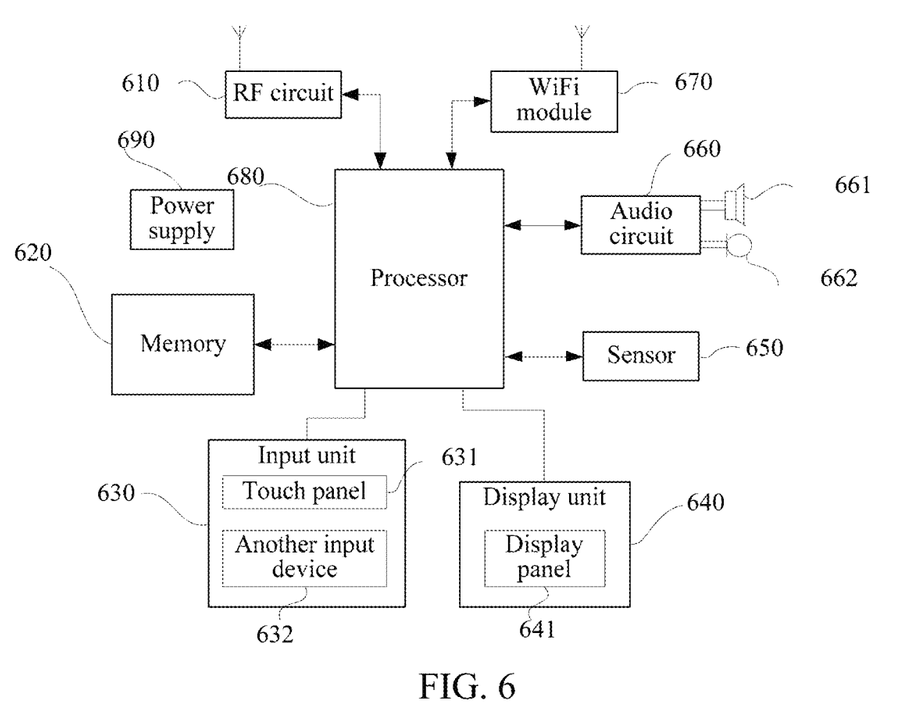
FIG. 6 is a schematic structural diagram of an audio delay determining device according to another embodiment of this application.

An embodiment of this application further provides a device, and the device may be the terminal device described in the audio delay determining method. As shown in FIG. 6, for ease of description, FIG. 6 shows only parts related to this embodiment of this application, and specific technical details are not disclosed, refer to the method embodiments of this application. The terminal may be any terminal device such as a mobile phone, a tablet computer, a personal digital assistant (PDA), a point of sales (POS), and a vehicle-mounted computer. That the terminal is a mobile phone is used as an example.

FIG. 6 is a block diagram of a structure of a part of a mobile phone related to a mobile terminal according to an embodiment of this application. Referring to FIG. 6, the mobile phone includes components such as a radio frequency (RF) circuit 610, a memory 620, an input unit 630, a display unit 640, a sensor 650, an audio circuit 640, a wireless (WiFi) module 660, a processor 680, and a power supply 690. A person skilled in the technology may understand that the structure of the mobile phone shown in FIG. 6 does not constitute a limitation to the mobile phone, and the mobile phone may include more components or fewer components than those shown in the figure, or some components may be combined, or a different component deployment may be used.

The following specifically describes the components of the mobile phone with reference to FIG. 6.

The RF circuit 610 may be configured to receive and send a signal during an information receiving and sending process or a call process. Specifically, the RF circuit receives downlink information from a base station, then delivers the downlink information to the processor 680 for processing, and sends related uplink data to the base station. Generally, the RF circuit 610 includes, but is not limited to, an antenna, at least one amplifier, a transceiver, a coupler, a low noise amplifier (LNA), and a duplexer. In addition, the RF circuit 610 may also communicate with a network and another device by means of wireless communication. The wireless communication may use any communications standard or protocol, which includes, but is not limited to, Global System for Mobile communications (GSM), General Packet Radio Service (GPRS), Code Division Multiple Access (CDMA), Wideband Code Division Multiple Access (WCDMA), Long Term Evolution (LTE), e-mail, Short Messaging Service (SMS), and the like.

The memory 620 may be configured to store a software program and module. The processor 680 runs the software program and module stored in the memory 620, to implement various functional applications and data processing of the mobile phone. The memory 620 may mainly include a program storage area and a data storage area. The program storage area may store an operating system, an application program required by at least one function (such as a sound playback function and an image display function), and the like. The data storage area may store data (such as audio data and an address book) created according to use of the mobile phone, and the like. In addition, the memory 620 may include a high speed random access memory, and may also include a non-volatile memory such as at least one magnetic disk storage device, a flash memory, or another volatile solid-state storage component.

The input unit 630 may be configured to receive input digit or character information, and generate a keyboard signal input related to the user setting and function control of the mobile phone. Specifically, the input unit 630 may include a touch panel 631 and another input device 632. The touch panel 631 may also be referred to as a touchscreen, and may collect a touch operation of a user on or near the touch panel (such as an operation of a user on or near the touch panel 631 by using any suitable object or attachment, such as a finger or a touch pen), and drive a corresponding connection apparatus according to a preset program. Optionally, the touch panel 631 may include two parts: a touch detection apparatus and a touch controller. The touch detection apparatus detects a touch position of the user, detects a signal generated by the touch operation, and transfers the signal to the touch controller. The touch controller receives the touch information from the touch detection apparatus, converts the touch information into touch point coordinates, and sends the touch point coordinate to the processor 680. Moreover, the touch controller can receive and execute a command sent from the processor 680. In addition, the touch panel 631 may be a resistive, capacitive, infrared, or surface sound wave type touch panel. In addition to the touch panel 631, the input unit 630 may further include the another input device 632. Specifically, the another input device 632 may include, but is not limited to: one or more of a physical keyboard, a functional key (such as a volume control key or a switch key), a track ball, a mouse, and a joystick.

The display unit 640 may be configured to display information input by the user or information provided for the user, and various menus of the mobile phone. The display unit 640 may include a display panel 641. Optionally, the display panel 641 may be configured by using a liquid crystal display (LCD), an organic light-emitting diode (OLED), or the like. Further, the touch panel 631 may cover the display panel 641. After detecting a touch operation on or near the touch panel 631, the touch panel 631 transfers the touch operation to the processor 680, to determine a type of a touch event. Then, the processor 680 provides corresponding visual output on the display panel 641 according to the type of the touch event. Although, in FIG. 6, the touch panel 631 and the display panel 641 are used as two separate parts to implement input and output functions of the mobile phone, in some embodiments, the touch panel 631 and the display panel 641 may be integrated to implement the input and output functions of the mobile phone.

The mobile phone may further include at least one sensor 650 such as an optical sensor, a motion sensor, and other sensors. Specifically, the optical sensor may include an ambient light sensor and a proximity sensor. The ambient light sensor may adjust luminance of the display panel 641 according to brightness of the ambient light. The proximity sensor may switch off the display panel 641 and/or backlight when the mobile phone is moved to the ear. As one type of motion sensor, an acceleration sensor may detect magnitude of accelerations in various directions (generally on three axes), may detect magnitude and a direction of the gravity when static, and may be applied to an application that recognizes the attitude of the mobile phone (for example, switching between landscape orientation and portrait orientation, a related game, and magnetometer attitude calibration), a function related to vibration recognition (such as a pedometer and a knock), and the like. Other sensors such as a gyroscope, a barometer, a hygrometer, a thermometer, and an infrared sensor, which may be configured in the mobile phone, are not further described herein.

The audio circuit 640, a speaker 641, and a microphone 642 may provide audio interfaces between the user and the mobile phone. The audio circuit 640 may convert received audio data into an electric signal and transmit the electric signal to the speaker 641. The speaker 641 converts the electric signal into a sound signal for output. On the other hand, the microphone 642 converts a collected sound signal into an electric signal. The audio circuit 640 receives the electric signal and converts the electric signal into audio data, and outputs the audio data to the processor 680 for processing. Then, the processor 680 sends the audio data to, for example, another mobile phone by using the RF circuit 610, or outputs the audio data to the memory 620 for further processing.

WiFi is a short distance wireless transmission technology. The mobile phone may help, by using the WiFi module 660, the user to receive and send e-mails, browse a web page, access streaming media, and so on, which provides wireless broadband Internet access for the user. Although FIG. 6 shows the WiFi module 660, it may be understood that the WiFi module 660 is not a necessary component of the mobile phone, and when required, the WiFi module 660 may be omitted provided that the scope of the essence of the present disclosure is not changed.

The processor 680 is the control center of the mobile phone, and is connected to various parts of the mobile phone by using various interfaces and lines. By running or executing the software program and/or module stored in the memory 620, and invoking data stored in the memory 620, the processor 980 performs various functions and data processing of the mobile phone, thereby performing overall monitoring on the mobile phone. Optionally, the processor 680 may include one or more processing units (processing circuitry). The processor 680 may integrate an application processor and a modem processor. The application processor mainly processes an operating system, a user interface, an application program, and the like. The modem processor mainly processes wireless communication. It may be understood that the foregoing modem processor may be not integrated into the processor 680.

The mobile phone further includes the power supply 690 (such as a battery) for supplying power to the components. The power supply may be logically connected to the processor 680 by using a power management system, thereby implementing functions such as charging, discharging and power consumption management by using the power management system.

Although not shown in the figure, the mobile phone may further include a camera, a Bluetooth module, and the like, which are not further described herein.

In this embodiment of this application, the processor 680 included in the terminal further controls the method procedures that are in the recording delay estimation and that are performed by the terminal device.

In the foregoing embodiments, the description of each embodiment has respective focuses. For a part that is not described in detail in an embodiment, reference may be made to related descriptions in other embodiments.

It may be clearly understood by a person skilled in the technology that, for the purpose of convenient and brief description, for a detailed working process of the foregoing system, apparatus, and unit, reference may be made to a corresponding process in the foregoing method embodiments, and details are not described herein.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual requirements to achieve the objectives of the solutions of the embodiments.

In addition, functional units in the embodiments of the present application may be integrated into one processing unit (processing circuitry), or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of this application essentially, or the part contributing to the related art, or some of the technical solutions may be implemented in a form of a software product executed by processing circuitry. The software product is stored in a non-transitory storage medium, and includes several instructions for instructing a computer device (which may be a personal computer, a server, or a network device) to perform all or some of the steps of the methods described in the embodiments of this application. The foregoing non-transitory storage medium includes: any medium that can store program code, such as a USB flash drive, a removable hard disk, a read-only memory (ROM), a random access memory (RAM), a magnetic disk, or an optical disc.

The technical solutions provided in this application are described above in detail. Although the principles and implementations of this application are described by using specific examples in this specification, the descriptions of the foregoing embodiments are merely intended to help understand the method and the core idea of the method of this application. In addition, a person of ordinary skill in the technology may make modifications to the specific implementations and application range according to the idea of this application. In conclusion, the content of this specification should not be construed as a limit on this application.

What is claimed is:

1. A method of determining an audio delay, comprising:
 obtaining first audio data and second audio data;
 extracting a first sub-fingerprint sequence of the first audio data and a second sub-fingerprint sequence of the second audio data, the first sub-fingerprint sequence including at least one first sub-fingerprint, the second sub-fingerprint sequence including at least one second sub-fingerprint;
 performing at least one relative shifting operation on the first sub-fingerprint sequence and the second sub-fingerprint sequence to form at least one sub-fingerprint pair, the first sub-fingerprint sequence and the second sub-fingerprint sequence being partially or entirely aligned in a time domain;
 determining, by processing circuitry of an information processing apparatus, similarity coefficients corresponding to a similarity between the first sub-fingerprint sequence and the second sub-fingerprint sequence according to a distance between two sub-fingerprints in the at least one sub-fingerprint pair;

determining, by the processing circuitry, a matching level between the first sub-fingerprint sequence and the second sub-fingerprint sequence according to the similarity coefficients; and determining, by the processing circuitry and according to the matching level, a delay of the second audio data relative to the first audio data.

2. The method according to claim 1, wherein the first audio data corresponds to accompaniment audio of a piece of music, and the second audio data corresponds to recorded audio that is recorded in association with the accompaniment audio.

3. The method according to claim 1, wherein the at least one first sub-fingerprint in the first sub-fingerprint sequence and the at least one second sub-fingerprint in the second sub-fingerprint sequence are sorted according to a chronological order, and the performing the at least one relative shifting operation on the first sub-fingerprint sequence and the second sub-fingerprint sequence further comprises:

causing the at least one first sub-fingerprint of the first sub-fingerprint sequence and the at least one second sub-fingerprint of the second sub-fingerprint sequence, one after another according to the chronological order, to have relative shifted positions.

4. The method according to claim 1, wherein the performing the at least one relative shifting operation includes performing a number of relative shifting operations that are less than a threshold.

5. The method according to claim 1, wherein the similarity coefficients are determined by:

$$Pi = k*(1 + \text{below}_{fator} - \text{above}_{fator});$$

$$\text{above}_{fator} = \frac{1}{j+1}\sum_{i=0}^{j}(1-di)*y, y = \begin{cases} 0, & \text{if } di > \text{threshold} \\ 1, & \text{if } di \leq \text{threshold} \end{cases}; \text{ and}$$

$$\text{below}_{fator} = \frac{1}{j+1}\sum_{i=0}^{j}(1-di)*y, y = \begin{cases} 1, & \text{if } di > \text{threshold} \\ 0, & \text{if } di \leq \text{threshold} \end{cases}, \text{ where}$$

Pi is one of the similarity coefficients, $\text{above}_{factor}$ is a first weighting factor, $\text{below}_{factor}$ is a second weighting factor, j is a quantity of the at least one sub-fingerprint pair, di is a distance between two sub-fingerprints in the $i^{th}$ sub-fingerprint pair, y is a weighting coefficient, and threshold is a preset threshold.

6. The method according to claim 1, wherein the determining the matching level further comprises:

selecting a similarity meeting a preset rule from the similarity coefficients as the matching level; or calculating an average value of the similarity coefficients, and using the average value as the matching level.

7. The method according to claim 1, further comprising:

performing frame division and windowing processing, and time-frequency transformation on the first audio data and the second audio data, wherein the performing frame division and windowing processing on the first audio data and the second audio data further comprises:

invoking a window function to divide the first audio data and the second audio data into multiple analysis frames of a preset frame length; and performing windowing processing on each analysis frame of the multiple analysis frames of the preset frame length, wherein the window function is any one of: a Hamming window function, a Hanning window function, and a Gaussian window function.

8. The method according to claim 1, further comprising:

compensating the second audio data based on the delay of the second audio data relative to the first audio data.

9. The method according to claim 7, wherein the first sub-fingerprint sequence and the second sub-fingerprint sequence are both integer sequences, and the extracting the first sub-fingerprint sequence of the first audio data and the second sub-fingerprint sequence of the second audio data further comprises:

transforming the windowed multiple analysis frames to a frequency domain and mapping the windowed multiple analysis frames in the frequency domain into a Bark domain, and dividing the multiple analysis frames mapped into the Bark domain into N subbands that do not intersect with other subbands in the frequency domain, where N is a positive integer;

performing, in each analysis frame of the multiple analysis frames, a second difference operation on "A" subbands that are in the N subbands and that are neighboring each other in the frequency domain, to obtain (N−1) differential values, where "A" is an energy value obtained through spectrum analysis and is a positive integer greater than 2 and less than N; and generating, according to the (N−1) differential values obtained through the second difference operation, an integer sequence used to form a respective sub-fingerprint.

10. The method according to claim 7, wherein the determining, according to the matching level, the delay of the second audio data relative to the first audio data further comprises:

determining the at least one relative shifting operation that is between the first sub-fingerprint sequence and the second sub-fingerprint sequence and that is corresponding to the matching level; and determining the delay according to the at least one relative shifting operation and the preset frame length.

11. An audio delay determining device, comprising:

processing circuitry configured to obtain first audio data and second audio data, extract a first sub-fingerprint sequence of the first audio data and a second sub-fingerprint sequence of the second audio data, the first sub-fingerprint sequence including at least one first sub-fingerprint, the second sub-fingerprint sequence including at least one second sub-fingerprint, perform at least one relative shifting operation on the first sub-fingerprint sequence and the second sub-fingerprint sequence to form at least one sub-fingerprint pair, the first sub-fingerprint sequence and the second sub-fingerprint sequence being partially or entirely aligned in a time domain;

determine similarity coefficients corresponding to a similarity between the first sub-fingerprint sequence and the second sub-fingerprint sequence according to a distance between two sub-fingerprints in the at least one sub-fingerprint pair, determine a matching level between the first sub-fingerprint sequence and the second sub-fingerprint sequence according to the similarity coefficients, and determine, according to the matching level, a delay of the second audio data relative to the first audio data.

12. The device according to claim 11, wherein the first audio data corresponds to accompaniment audio of a piece of music, and the second audio data corresponds to recorded audio that is recorded in association with the accompaniment audio.

13. The device according to claim 11, wherein the at least one first sub-fingerprint in the first sub-fingerprint sequence and the at least one second sub-fingerprint in the second sub-fingerprint sequence are sorted according to a chronological order, and the processing circuitry is further configured to:
cause the at least one first sub-fingerprint of the first sub-fingerprint sequence and the at least one second sub-fingerprint of the second sub-fingerprint sequence, one after another according to the chronological order, to have relative shifted positions.

14. The device according to claim 11, wherein
the similarity coefficients are determined by:

$$Pi = k*(1 + \text{below}_{fator} - \text{above}_{fator});$$

$$\text{above}_{fator} = \frac{1}{j+1}\sum_{i=0}^{j}(1-di)*y, y = \begin{cases} 0, & \text{if } di > \text{threshold} \\ 1, & \text{if } di \leq \text{threshold} \end{cases}; \text{and}$$

$$\text{below}_{fator} = \frac{1}{j+1}\sum_{i=0}^{j}(1-di)*y, y = \begin{cases} 1, & \text{if } di > \text{threshold} \\ 0, & \text{if } di \leq \text{threshold} \end{cases}, \text{where}$$

Pi is one of the similarity coefficients, $\text{above}_{factor}$ is a first weighting factor, $\text{below}_{factor}$ is a second weighting factor, j is a quantity of the at least one sub-fingerprint pair, di is a distance between two sub-fingerprints in the $i^{th}$ sub-fingerprint pair, y is a weighting coefficient, and threshold is a preset threshold.

15. The audio delay determining device according to claim 11, wherein the processing circuitry is further configured to compensate the second audio data based on the delay of the second audio data relative to the first audio data.

16. A non-transitory computer-readable storage medium storing a program executable by a processor to perform:
obtaining first audio data and second audio data;
extracting a first sub-fingerprint sequence of the first audio data and a second sub-fingerprint sequence of the second audio data, the first sub-fingerprint sequence including at least one first sub-fingerprint, the second sub-fingerprint sequence including at least one second sub-fingerprint;
performing at least one relative shifting operation on the first sub-fingerprint sequence and the second sub-fingerprint sequence to form at least one sub-fingerprint pair, the first sub-fingerprint sequence and the second sub-fingerprint sequence being partially or entirely aligned in a time domain;
determining similarity coefficients corresponding to a similarity between the first sub-fingerprint sequence and the second sub-fingerprint sequence according to a distance between two sub-fingerprints in the at least one sub-fingerprint pair;
determining a matching level between the first sub-fingerprint sequence and the second sub-fingerprint sequence according to the similarity coefficients; and
determining, according to the matching level, a delay of the second audio data relative to the first audio data.

\* \* \* \* \*